United States Patent
Leisenring et al.

(10) Patent No.: US 10,059,338 B2
(45) Date of Patent: Aug. 28, 2018

(54) METHOD AND SYSTEM FOR REGENERATING A GASOLINE PARTICULATE FILTER

(71) Applicant: Ford Global Technologies, LLC, Dearborn, MI (US)

(72) Inventors: Kenneth Carl Leisenring, Dearborn, MI (US); Allen Lehmen, Howell, MI (US); Colin Yager, Dexter, MI (US); Gregory Mason, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 14/958,277

(22) Filed: Dec. 3, 2015

(65) Prior Publication Data
US 2017/0158194 A1 Jun. 8, 2017

(51) Int. Cl.
| | |
|---|---|
| *B60W 30/14* | (2006.01) |
| *B60W 30/188* | (2012.01) |
| *F01N 3/025* | (2006.01) |
| *F02D 41/02* | (2006.01) |
| *F02D 41/12* | (2006.01) |
| *F02D 37/02* | (2006.01) |
| *F01N 9/00* | (2006.01) |

(52) U.S. Cl.
CPC ........ *B60W 30/143* (2013.01); *B60W 30/188* (2013.01); *F01N 3/025* (2013.01); *F01N 9/002* (2013.01); *F02D 37/02* (2013.01); *F02D 41/027* (2013.01); *F02D 41/029* (2013.01); *F02D 41/123* (2013.01); *B60W 2550/14* (2013.01); *B60W 2560/00* (2013.01); *B60W 2710/0622* (2013.01); *B60W 2710/0666* (2013.01); *F01N 2430/02* (2013.01); *F01N 2430/085* (2013.01); *F01N 2900/10* (2013.01); *F01N 2900/12* (2013.01); *F01N 2900/1606* (2013.01); *F02D 2200/0812* (2013.01); *F02D 2200/501* (2013.01); *F02D 2200/702* (2013.01)

(58) Field of Classification Search
CPC combination set(s) only.
See application file for complete search history.

(56) References Cited

U.S. PATENT DOCUMENTS

| | | | |
|---|---|---|---|
| 8,341,947 B2 * | 1/2013 | Hepburn | F01N 3/101 60/274 |
| 2002/0073696 A1 | 6/2002 | Kuenstler et al. | |
| 2004/0044457 A1 | 3/2004 | Kolmanovsky et al. | |
| 2011/0072787 A1 * | 3/2011 | Hubbard | F01N 3/0253 60/276 |
| 2015/0377160 A1 * | 12/2015 | Bott | F02D 41/0245 95/1 |
| 2016/0123200 A1 * | 5/2016 | Ramappan | F02D 37/02 60/285 |

* cited by examiner

*Primary Examiner* — Thomas G Black
*Assistant Examiner* — Ana D Thomas
(74) *Attorney, Agent, or Firm* — Julia Voutyras; McCoy Russell LLP (57) ABSTRACT

Methods and systems are presented for regenerating a particulate filter. In one example, vehicle speed control mode parameters may be adjusted in response to an amount of soot stored in a particulate filter being greater than a first threshold. The vehicle speed control parameters may be returned to base values in response to the amount of soot stored in the particulate filter being less than a second threshold.

20 Claims, 6 Drawing Sheets

METHOD AND SYSTEM FOR REGENERATING A GASOLINE PARTICULATE FILTER

FIELD

The present description relates generally to methods and systems for improving the possibility for regenerating a gasoline particulate filter (GPF) while a vehicle is operating in an automatic speed control mode.

BACKGROUND/SUMMARY

A vehicle that includes a direct injection gasoline engine may include a GPF. The GPF may store carbonaceous soot produced by the direct injection engine. From time to time, the GPF may be regenerated to reduce exhaust back pressure and the amount of soot stored in the GPF. The GPF may be regenerated by operating the GPF above a threshold temperature and providing excess oxygen to the GPF. The excess oxygen may help to combust soot stored in the GPF, thereby reducing the amount of soot stored in the GPF. The excess oxygen may be provided by combusting a lean air-fuel ratio in the engine or via providing air to the GPF. However, vehicle emissions may increase if the engine is operated with a lean air-fuel ratio or if air is provided to the vehicle's exhaust gas after treatment system. Therefore, it may be desirable to increase the possibility of operating the vehicle during conditions where oxygen may be provided to the GPF without increasing vehicle emissions.

The inventors herein have recognized the above-mentioned issue and have developed a vehicle system, comprising: a spark ignited engine; an exhaust system coupled to the spark ignited engine, the exhaust system including a particulate filter; and a controller, the controller including executable instructions stored in non-transitory memory to operate the spark ignited engine and adjust one or more automatic vehicle speed controller parameters in response to an amount of soot stored in a particulate filter greater than a threshold amount.

By adjusting one or more vehicle speed controller parameters in response to an amount of soot stored in a particulate filter, it may be possible to provide the technical result of regenerating a particulate filter more frequently than if the vehicle operates with a same group of vehicle speed controller parameters during automatic vehicle speed control. In particular, base vehicle speed controller control limits may be populated with values that maintain vehicle speed at a desired vehicle speed plus or minus a predetermined vehicle speed. Further, the vehicle speed controller may include modest gains to maintain vehicle speed within an upper vehicle speed limit and a lower vehicle speed limit. However, if a large amount of soot is stored in the particulate filter, the vehicle speed controller gains may be increased and the desired vehicle speed range may be increased to induce more frequent entry into deceleration fuel shut-off so that the particulate filter may be passively regenerated while operating the vehicle in a speed control mode.

For example, when an amount of soot stored in a particulate filter is less than a first threshold, a desired vehicle speed may be 100 KPH. The controller may have an upper vehicle speed boundary of 103 KPH and a lower vehicle speed boundary of 97 KPH. If vehicle speed exceeds 103 KPH, engine torque may be gradually reduced so as to not make rapid engine torque changes. Similarly, if vehicle speed is less than 97 KPH, engine torque may be gradually increased so as to provide a gradual increase in engine torque and vehicle speed. In this way, vehicle speed may be controlled to desired vehicle speed without inducing larger engine torque changes when the amount of soot stored in a particulate filter is less than a first threshold.

On the other hand, if the amount of soot stored in the particulate filter is greater than a threshold, vehicle speed controller parameters may be adjusted to increase the possibility of entering a deceleration fuel shut-off mode. For example, the controller upper vehicle speed limit may be adjusted to 108 KPH and a lower vehicle speed limit may be adjusted to 93 KPH for a desired vehicle speed of 100 KPH. Further, the vehicle speed controller gains may be made more aggressive (e.g., increased) in response to the amount of soot stored within the particulate filter.

The vehicle speed control upper vehicle speed limit may be increased and a lower vehicle speed limit may be decreased in response to the amount of soot stored in the particulate filter being greater than a threshold to allow requested engine torque to approach zero for a longer period of time if the vehicle encounters a negative grade. Further, the vehicle speed controller gains may be increased in response to the amount of soot stored in the particulate filter being greater than the threshold so that larger and longer engine torque reductions may be provided to increase the possibility of entering deceleration fuel shut-off mode.

The present description may provide several advantages. In particular, the approach may increase the propensity for larger engine torque changes while operating a vehicle in an automatic speed control mode so that the vehicle has a greater possibility of entering deceleration fuel shut-off mode. Further, the approach may reduce the possibility of the particulate filter being actively regenerated, thereby increasing vehicle fuel efficiency. Further still, the approach may increase the possibility of the particulate filter being ready for regeneration during a deceleration fuel shut-off mode.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
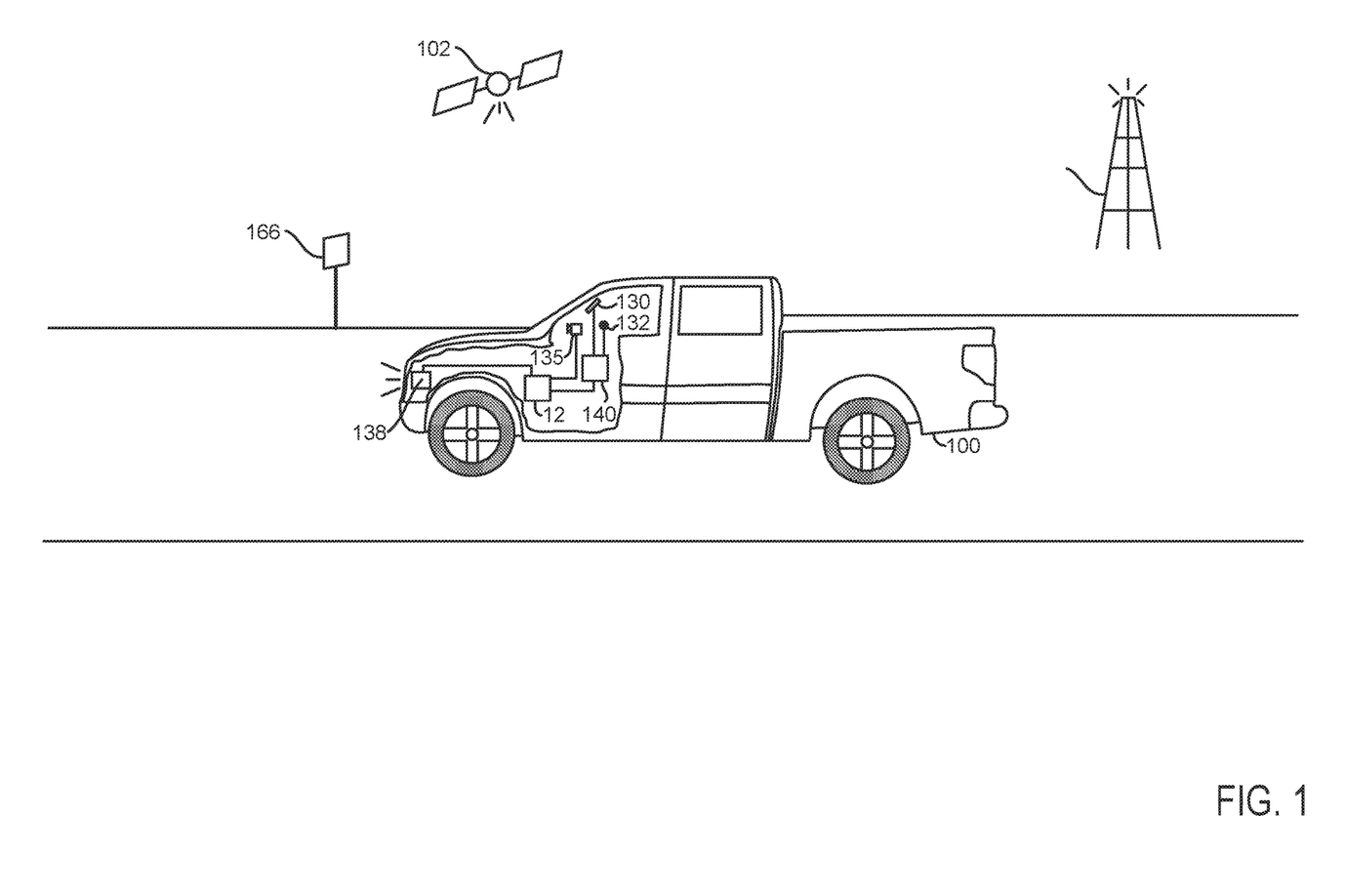
FIG. 1 shows an example vehicle that may be included in the systems and methods described herein.
Figure 2:
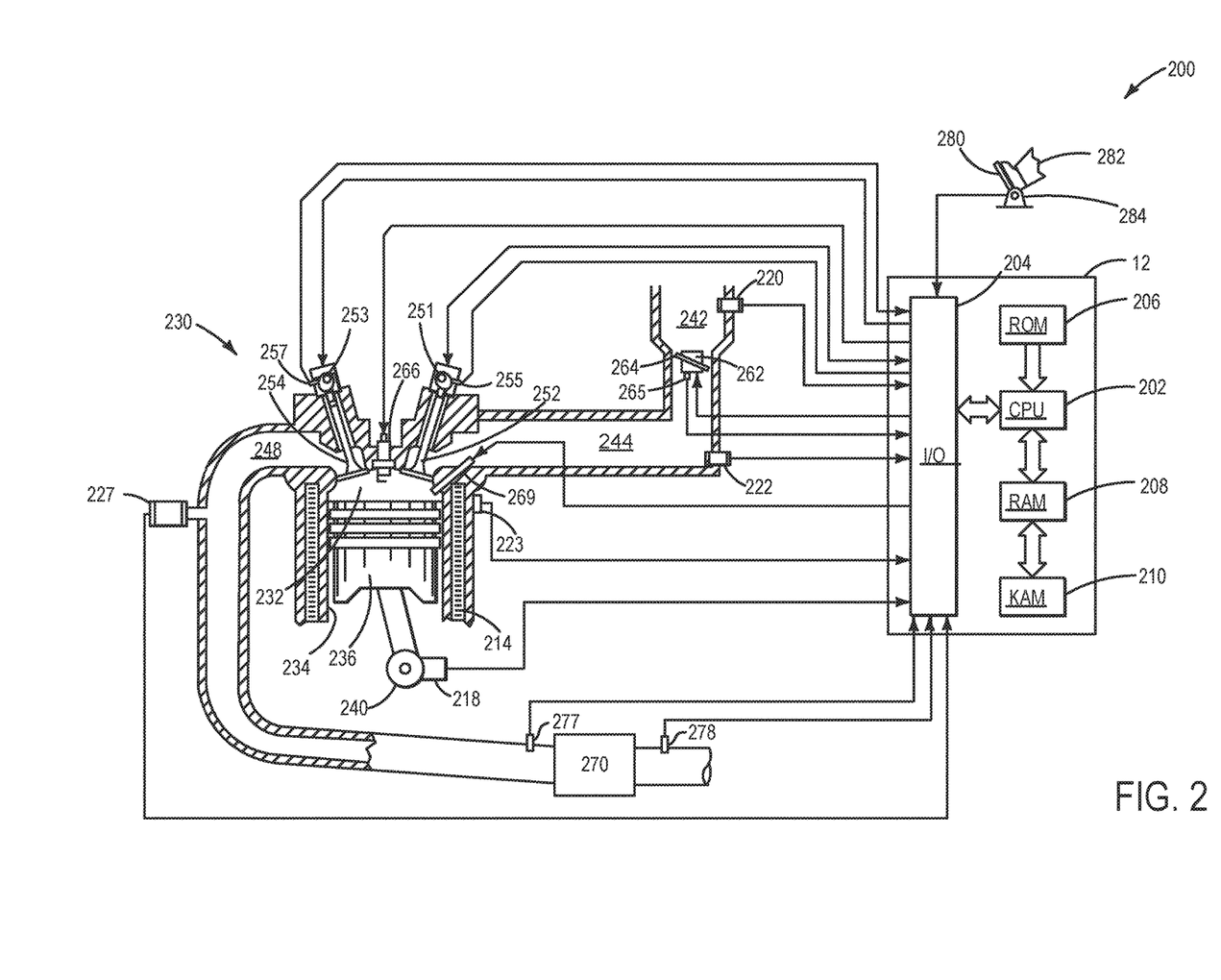
FIG. 2 shows an example engine for the vehicle of FIG. 1.
Figure 3:
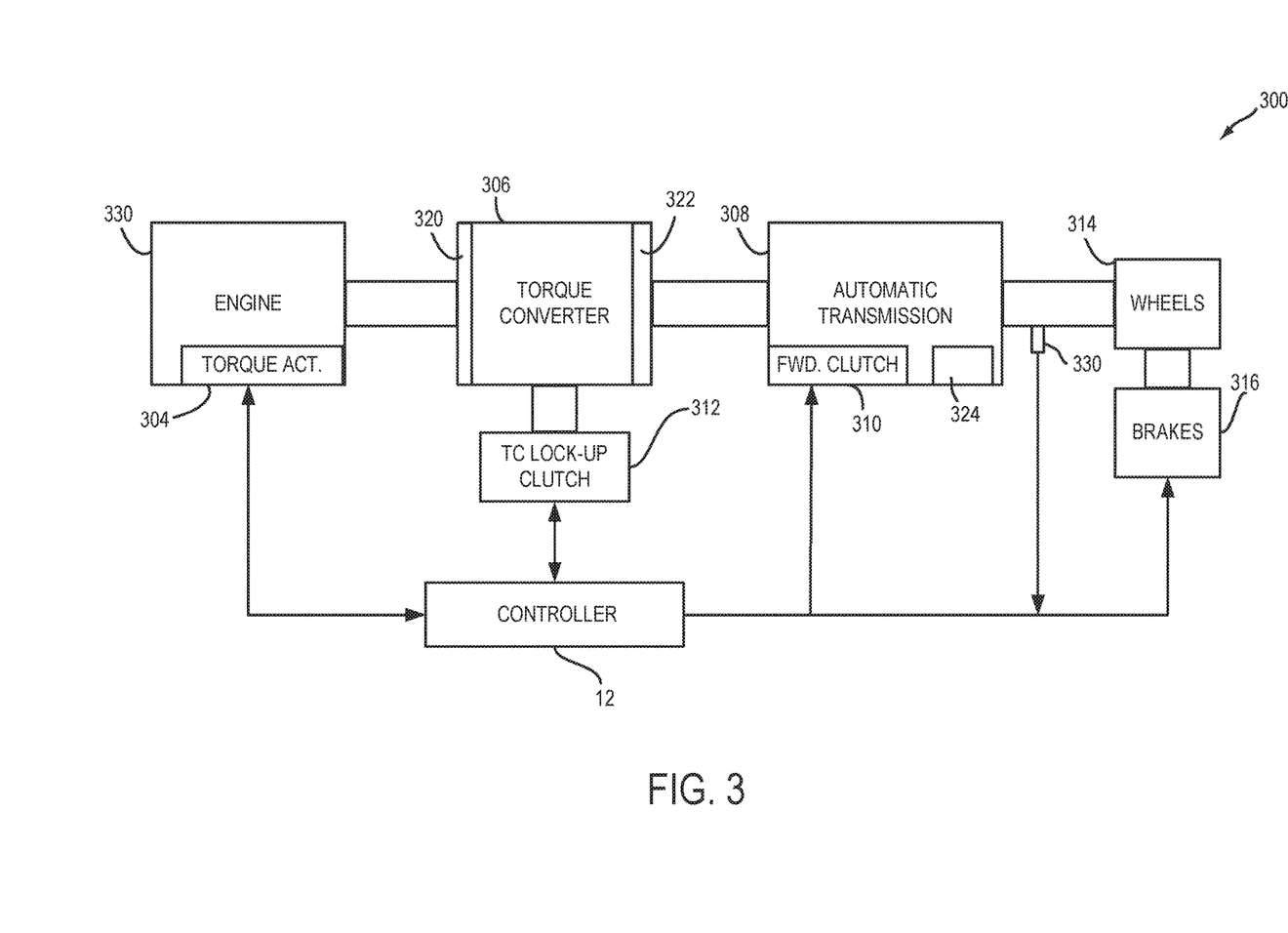
FIG. 3 shows an example powertrain for the vehicle of FIG. 1.
Figure 4:
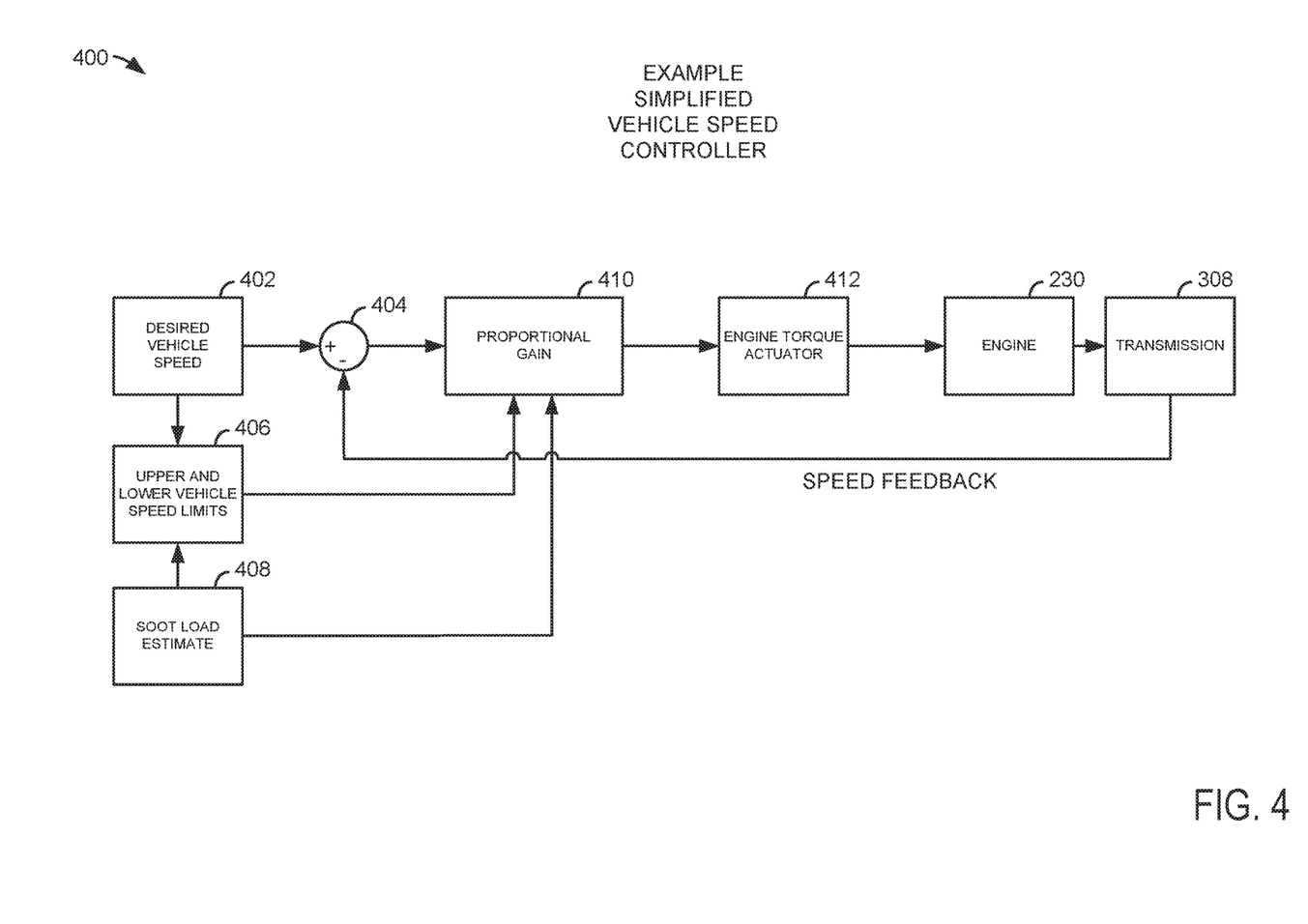
FIG. 4 shows a block diagram of an example vehicle speed controller.
Figure 5:
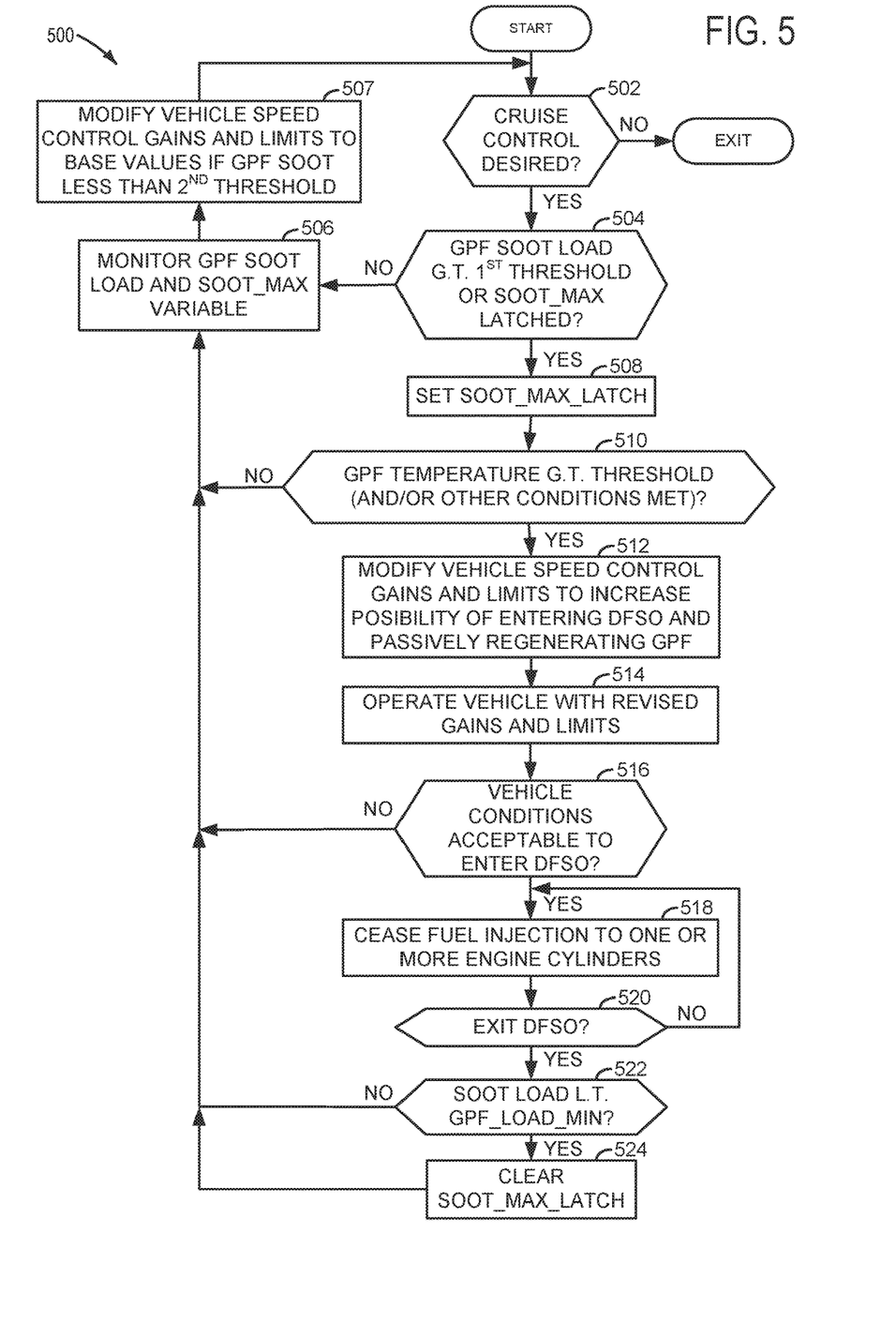
FIG. 5 shows an example method for operating a vehicle.
Figure 6:
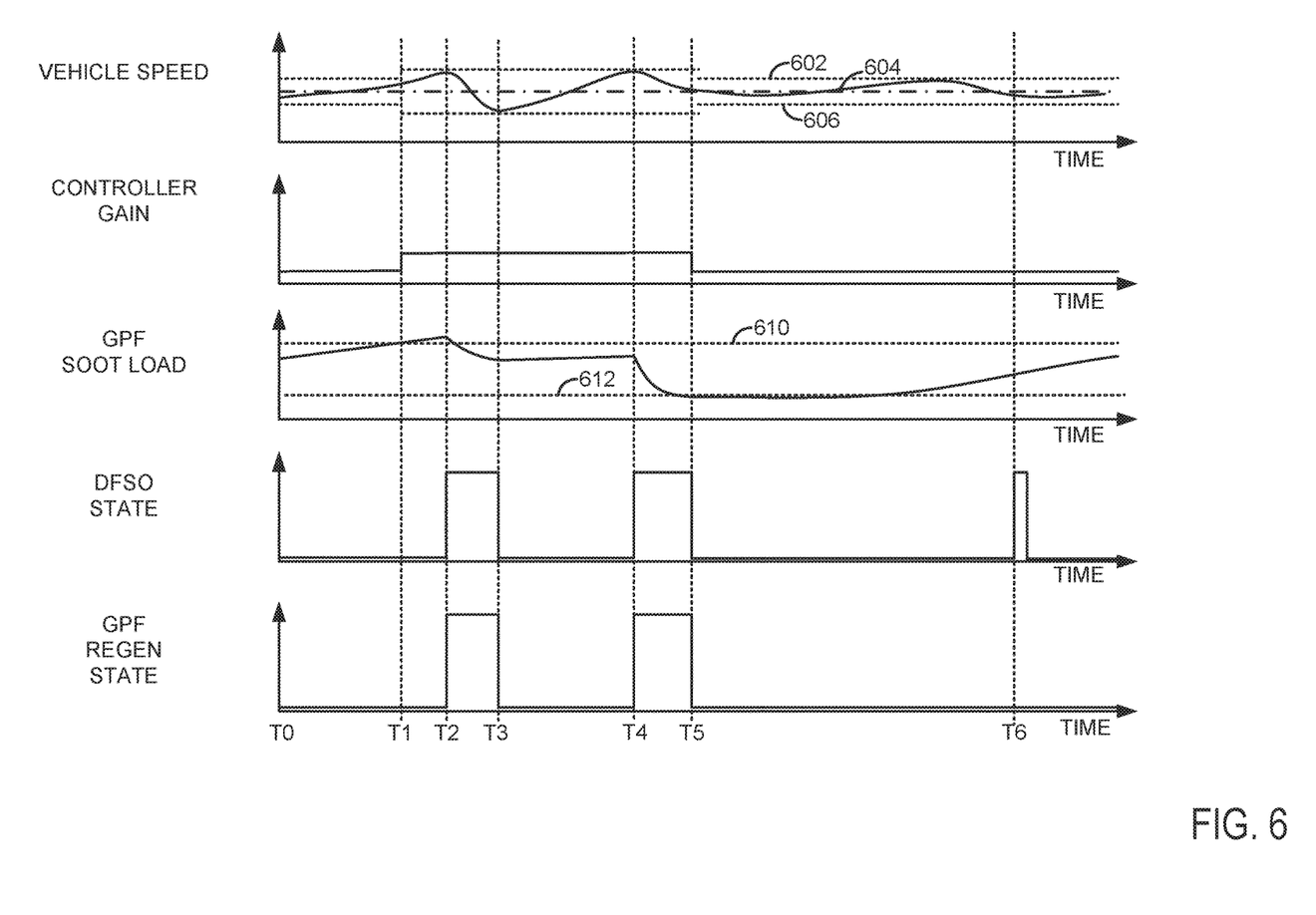
FIG. 6 shows an example vehicle operating sequence according to the method of FIG. 5.

The following description relates to systems and methods for regenerating a particulate filter while a vehicle is operating in an automatic speed or cruise control mode. FIG. 1 shows a non-limiting example vehicle for operating in a cruise control mode and passively regenerating a particulate filter. FIG. 2 shows an example engine for the vehicle of FIG. 1. A powertrain or driveline for the vehicle of FIG. 1 is shown in FIG. 3. A block diagram for an example vehicle speed controller is shown in FIG. 4. A method of operating a vehicle is shown in FIG. 5. Finally, a vehicle operating sequence according to the method of FIG. 5 is shown in FIG. 6.

Referring now to FIG. 1, vehicle 100 includes a controller 12 for receiving sensor data and adjusting actuators. Controller 12 may operate vehicle 100 in a cruise control mode where vehicle speed is maintained within a desired vehicle speed range bounded by upper and lower vehicle speed thresholds. In some examples, controller 12 may cooperate with additional controllers to operate vehicle 100. Vehicle 100 is shown with global positioning system (GPS) receiver 130. Satellite 102 provides time stamped information to GPS receiver 130 which relays the information to vehicle position determining system 140. Vehicle positioning determination system 140 relays present and future road grade data to controller 12 based on Satellite data. Vehicle 100 may also be equipped with optional camera 135 for surveying road conditions in the path of vehicle 135. For example, camera 135 may acquire road conditions from road side signs 166 or displays. Vehicle position determining system 140 may alternatively acquire information for determining vehicle position from stationary broadcast tower 104 via receiver 132. In some examples, vehicle 100 may also include a sensor 138 for determining the proximity of vehicles in the travel path of vehicle 100. Sensor 138 may be laser, sound, or radar signal based.

In this example, vehicle 100 is shown as a passenger vehicle. However, in some examples, vehicle 100 may be a commercial vehicle such as a freight hauling semi-trailer or a truck.

Referring now to FIG. 2, an example vehicle engine is shown. In this example, the engine is a spark ignition engine (e.g., combustion in the engine is initiated via a spark produced via a spark plug).

FIG. 2 is schematic diagram showing one cylinder of a multi-cylinder engine 230 in an engine system 200 is shown. Engine 230 may be controlled at least partially by a control system including a controller 12 and by input from a vehicle operator 282 via an input device 280. In this example, the input device 280 includes an accelerator pedal and a pedal position sensor 284 for generating a proportional pedal position signal.

A combustion chamber 232 of the engine 230 may include a cylinder formed by cylinder walls 234 with a piston 236 positioned therein. The piston 236 may be coupled to a crankshaft 240 so that reciprocating motion of the piston is translated into rotational motion of the crankshaft. The crankshaft 240 may be coupled to at least one drive wheel of a vehicle via an intermediate transmission system. Further, a starter motor may be coupled to the crankshaft 240 via a flywheel to enable a starting operation of the engine 230.

Combustion chamber 232 may receive intake air from an intake manifold 244 via an intake passage 242 and may exhaust combustion gases via an exhaust passage 248. The intake manifold 344 and the exhaust passage 248 can selectively communicate with the combustion chamber 232 via respective intake valve 252 and exhaust valve 254. In some examples, the combustion chamber 232 may include two or more intake valves and/or two or more exhaust valves.

In this example, the intake valve 252 and exhaust valve 254 may be controlled by cam actuation via respective cam actuation systems 251 and 253. The cam actuation systems 251 and 253 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 252 and exhaust valve 254 may be determined by position sensors 255 and 257, respectively. In alternative examples, the intake valve 252 and/or exhaust valve 254 may be controlled by electric valve actuation. For example, the cylinder 232 may alternatively include an intake valve controlled via electric valve actuation and an exhaust valve controlled via cam actuation including CPS and/or VCT systems.

A fuel injector 269 is shown coupled directly to combustion chamber 232 for injecting fuel directly therein in proportion to the pulse width of a signal received from the controller 12. In this manner, the fuel injector 269 provides what is known as direct injection of fuel into the combustion chamber 232. The fuel injector may be mounted in the side of the combustion chamber or in the top of the combustion chamber, for example. Fuel may be delivered to the fuel injector 269 by a fuel system (not shown) including a fuel tank, a fuel pump, and a fuel rail. In some examples, the combustion chamber 232 may alternatively or additionally include a fuel injector arranged in the intake manifold 244 in a configuration that provides what is known as port injection of fuel into the intake port upstream of the combustion chamber 232.

Spark is provided to combustion chamber 232 via spark plug 266. The ignition system may further comprise an ignition coil (not shown) for increasing voltage supplied to spark plug 266.

The intake passage 242 may include a throttle 262 having a throttle plate 264. In this particular example, the position of throttle plate 264 may be varied by the controller 12 via a signal provided to an electric motor or actuator included with the throttle 262, a configuration that is commonly referred to as electronic throttle control (ETC). In this manner, the throttle 262 may be operated to vary the intake air provided to the combustion chamber 232 among other engine cylinders. The position of the throttle plate 264 may be provided to the controller 12 by a throttle position signal. The intake passage 242 may include a mass air flow sensor 220 and a manifold air pressure sensor 222 for sensing an amount of air entering engine 230.

An exhaust gas sensor 227 is shown coupled to the exhaust passage 248 upstream of an emission control device 270 according to a direction of exhaust flow. The sensor 227 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 227 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 270 is shown arranged along the exhaust passage 248 downstream of the exhaust gas sensor 227. The device 270 may be a three way catalyst (TWC), $NO_x$ trap, a particulate filter, or combinations thereof. In some examples, during operation of the engine 230, the emission control device 270 may be periodically reset by operating at least one cylinder of the engine within a particular air-fuel ratio. In examples where emissions control device 270 is a particulate filter, soot trapped in emissions control device 270 may be combusted to regenerate the device. A pressure ratio across emissions control device 270 may be determined from pressure sensors 277 and 278. The pressure ratio may be indicative of an amount of soot stored in the emissions control device 270.

The controller 12 is shown in FIG. 3 as a microcomputer, including a microprocessor unit 202, input/output ports 204, an electronic storage medium for executable programs and calibration values shown as read only memory chip 206 (e.g., non-transitory memory) in this particular example, random access memory 208, keep alive memory 210, and a data bus. The controller 12 may receive various signals from sensors coupled to the engine 230, in addition to those signals previously discussed, including measurement of inducted mass air flow (MAF) from the mass air flow sensor 220; engine coolant temperature (ECT) from a temperature sensor 223 coupled to a cooling sleeve 214; an engine position signal from a Hall effect sensor 218 (or other type) sensing a position of crankshaft 240; throttle position from a throttle position sensor 265; and manifold absolute pressure (MAP) signal from the sensor 222. An engine speed signal may be generated by the controller 12 from crankshaft position sensor 218. Manifold pressure signal also provides an indication of vacuum, or pressure, in the intake manifold 244. Note that various combinations of the above sensors may be used, such as a MAF sensor without a MAP sensor, or vice versa. During engine operation, engine torque may be inferred from the output of MAP sensor 222 and engine speed. Further, this sensor, along with the detected engine speed, may be a basis for estimating charge (including air) inducted into the cylinder. In one example, the crankshaft position sensor 218, which is also used as an engine speed sensor, may produce a predetermined number of equally spaced pulses every revolution of the crankshaft.

The storage medium read-only memory 206 can be programmed with computer readable data representing non-transitory instructions executable by the processor 202 for performing at least portions of the methods described below as well as other variants that are anticipated but not specifically listed.

During operation, each cylinder within engine 230 typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 232 via intake manifold 244, and piston 236 moves to the bottom of the cylinder so as to increase the volume within combustion chamber 232. The position at which piston 236 is near the bottom of the cylinder and at the end of its stroke (e.g., when combustion chamber 232 is at its largest volume) is typically referred to by those of skill in the art as bottom dead center (BDC).

During the compression stroke, intake valve 252 and exhaust valve 254 are closed. Piston 236 moves toward the cylinder head so as to compress the air within combustion chamber 232. The point at which piston 236 is at the end of its stroke and closest to the cylinder head (e.g., when combustion chamber 232 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 266, resulting in combustion.

During the expansion stroke, the expanding gases push piston 236 back to BDC. Crankshaft 240 converts piston movement into a rotational torque of the rotary shaft. Finally, during the exhaust stroke, the exhaust valve 254 opens to release the combusted air-fuel mixture to exhaust manifold 248 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 2 shows only one cylinder of a multi-cylinder engine, and each cylinder may similarly include its own set of intake/exhaust valves, fuel injector, spark plug, etc.

Referring now to FIG. 3, a schematic of a vehicle drive-train 300 is shown. Drive-train 300 may be powered by engine 230 as shown in greater detail in FIG. 2. In one example, engine 230 may be a gasoline engine. Engine 230 may be started with an engine starting system (not shown). Further, engine 230 may generate or adjust torque via torque actuator 304, such as a fuel injector, throttle, cam, etc.

An engine output torque may be transmitted to torque converter 306 to drive a step-ratio automatic transmission 308 by engaging one or more clutches, including forward clutch 310, where the torque converter may be referred to as a component of the transmission. Torque converter 306 includes an impeller 320 that transmits torque to turbine 322 via hydraulic fluid. One or more gear clutches 324 may be engaged to change gear ratios between engine 230 and vehicle wheels 314. The output of the torque converter 306 may in turn be controlled by torque converter lock-up clutch 312. As such, when torque converter lock-up clutch 312 is fully disengaged, torque converter 306 transmits torque to automatic transmission 308 via fluid transfer between the torque converter turbine 322 and torque converter impeller 320, thereby enabling torque multiplication. In contrast, when torque converter lock-up clutch 312 is fully engaged, the engine output torque is directly transferred via the torque converter clutch 312 to an input shaft of transmission 308. Alternatively, the torque converter lock-up clutch 312 may be partially engaged, thereby enabling the amount of torque relayed to the transmission to be adjusted. A controller 12 may be configured to adjust the amount of torque transmitted by the torque converter by adjusting the torque converter lock-up clutch in response to various engine operating conditions, or based on a driver-based engine operation request.

Torque output from the automatic transmission 308 may in turn be relayed to wheels 314 to propel the vehicle. Specifically, automatic transmission 308 may adjust an input driving torque at the input shaft (not shown) responsive to a vehicle traveling condition before transmitting an output driving torque to the wheels. Vehicle speed may be determined via speed sensor 330.

Further, wheels 314 may be locked by engaging wheel brakes 316. In one example, wheel brakes 316 may be engaged in response to the driver pressing his foot on a brake pedal (not shown). In the similar way, wheels 314 may be unlocked by disengaging wheel brakes 316 in response to the driver releasing his foot from the brake pedal.

Referring now to FIG. 4, a block diagram of an example vehicle cruise control system is shown. Vehicle speed control system or cruise control system 400 includes a desired vehicle speed. The desired vehicle speed may be input via a driver or it may be the vehicle's present speed when a driver activates speed control mode via a switch or other input. The desired vehicle speed is input to summing junction 404 and block 406.

System 408 estimates an amount of soot stored in the vehicle's particulate filter at 408. In one example, the amount of soot is estimated based on air flow through the engine and a pressure drop across the particulate filter at the present engine air flow rate. In one example, a table or function holds empirically determined soot amounts. The table or function is indexed via engine air flow rate and the pressure drop across the particulate filter. The soot amount determined at 408 is input to block 406 and block 410.

At block 406, the soot load estimate and desired vehicle speed are a basis for determining the vehicle upper and lower speed limits for operating in speed control mode. In one example, the soot load estimate is used to index a function that outputs adder values that are a basis for the vehicle's upper speed limit and the vehicle's lower speed limit. In particular, the adder values are added to the desired vehicle speed determined at 402. For example, if the function outputs a value of 3 KPH, the desired vehicle speed determined at 402 plus 3 KPH equals the vehicle's upper speed limit. The desired vehicle speed minus 3 KPH equals the vehicle's lower speed limit. The upper and lower vehicle speed limits are input to block 410.

At 404, actual vehicle speed determined from transmission 308 is subtracted from desired vehicle speed to produce a vehicle speed error. The vehicle speed error is passed to block 410.

At block 410, the vehicle speed error is multiplied by a proportional gain value. The proportional gain value is output from one or more tables or functions that are selected based on the vehicle speed relative to the vehicle upper speed limit and the vehicle lower speed limit. The proportional gain is further based on the amount of soot stored in the particulate filter. In one example, the proportional gain is output from one of six tables or functions. A first table supplies the proportional gain when vehicle speed is less than the lower vehicle speed limit when the amount of soot stored in the particulate filter is greater than a threshold or when particulate filter regeneration is being called for (e.g., when SOOT_MAX_LATCH equals 1). A second table supplies the proportional gain when vehicle speed is less than the lower vehicle speed limit when the amount of soot stored in the particulate filter is less than a threshold or when particulate filter regeneration is not being called for (e.g., when SOOT_MAX_LATCH equals 0). A third table supplies the proportional gain when vehicle speed is greater than the lower vehicle speed limit and less than the upper vehicle speed limit when the amount of soot stored in the particulate filter is greater than a threshold or when particulate filter regeneration is being called for (e.g., when SOOT_MAX_LATCH equals 1). A fourth table supplies the proportional gain when vehicle speed is greater than the lower vehicle speed limit and less than the upper vehicle speed limit when the amount of soot stored in the particulate filter is less than a threshold or when particulate filter regeneration is being called for (e.g., when SOOT_MAX_LATCH equals 0). A fifth table supplies the proportional gain when vehicle speed is greater than the upper vehicle speed limit when the amount of soot stored in the particulate filter is greater than a threshold or when particulate filter regeneration is being called for (e.g., when SOOT_MAX_LATCH equals 1). A sixth table supplies the proportional gain when vehicle speed is greater than the upper vehicle speed limit when the amount of soot stored in the particulate filter is less than a threshold or when particulate filter regeneration is being called for (e.g., when SOOT_MAX_LATCH equals 0). The result of the multiplication is passed to block 412.

At block 412, controller 400 adjusts one or more engine actuators (e.g., throttle, fuel injection timing, etc.) to increase or decrease engine torque to that vehicle speed may be regulated toward the desired vehicle speed. The engine torque adjustments are applied to the engine 230. The engine torque is applied to transmission 308 to adjust vehicle speed.

It should be noted that controller 400 is exemplary in nature and is not intended to be limiting. For example, the desired vehicle speed and amount of soot stored in the particulate filter may be a basis for adjusting proportional and integral gains in a proportional/integral vehicle speed controller. Further, the desired vehicle speed and amount of soot stored in the particulate filter may be a basis for adjusting values in a gain matrix of a state-space controller or other known controller types. Further, upper and lower vehicle speed limits in various possible controller designs may be adjusted based on the desired vehicle speed and the amount of soot stored in the particulate filter. The gains and limits may be empirically determined and stored in controller memory.

Thus, the system of FIGS. 1-4 provides for a vehicle system, comprising: a spark ignited engine; an exhaust system coupled to the spark ignited engine, the exhaust system including a particulate filter; and a controller, the controller including executable instructions stored in non-transitory memory to operate the spark ignited engine and adjust one or more automatic vehicle speed controller parameters in response to an amount of soot stored in a particulate filter greater than a threshold amount. The vehicle system further comprises additional instructions to control an amount of air flowing through the spark ignited engine during a condition of deceleration fuel shut-off in response to the amount of soot stored in the particulate filter.

In some examples, the vehicle system further comprises additional instructions to retard spark timing of the spark ignited engine in response to being a within a threshold distance of an expected road condition where deceleration fuel shut off is expected. The vehicle system includes where the one or more automatic vehicle speed controller parameters includes a controller gain variable. The vehicle system includes where the one or more automatic vehicle speed controller parameters includes a controller upper vehicle speed limit. The vehicle system includes where the one or more automatic vehicle speed controller parameters are adjusted to increase the possibility of entering a deceleration fuel shut-off mode of operation. The vehicle system includes where fuel supplied to one or more engine cylinders ceases to flow in the deceleration fuel shut-off mode.

The system of FIGS. 1-4 also provides for a vehicle system, comprising: a spark ignited engine; a controller, the controller including executable instructions stored in non-transitory memory to operate the spark ignited engine and enter a deceleration fuel shut-off mode in response to vehicle conditions resulting from road conditions of a section of road and an amount of soot stored in a particulate filter being greater than a threshold amount while the vehicle is operated in a speed control mode. The vehicle system further comprises additional instructions to not enter the deceleration fuel shut-off mode in response to vehicle conditions resulting from road conditions of the section of road and the amount of soot stored in the particulate filter being less than the threshold amount while the vehicle is operating in the speed control mode.

In some examples, the vehicle system further comprises adjusting one or more vehicle speed control parameters in response to the amount of soot stored in the particulate filter being greater than the threshold amount. The vehicle system includes where the road condition is a change in road grade. The vehicle system includes where the change in road grade is from a positive grade to a negative grade. The vehicle system further comprises additional instructions to retard spark timing in anticipation of a road condition and the amount of soot stored in the particulate filter being greater than the threshold amount. The vehicle system includes where the road condition is anticipated via a navigation system.

Referring now to FIG. 5, an example method 500 for operating a vehicle with a particulate filter is shown. At least portions of method 500 may be included in a system as shown in FIGS. 1-3 as executable instructions stored in non-transitory memory. Further, portions of method 500 may be performed in the physical world via a controller, actuators, and sensors. Additionally, the method of FIG. 5 may provide the operating sequence shown in FIG. 6. The methods of FIG. 5 may be performed real-time in a vehicle driving on a road.

At 502, method 500 judges if vehicle cruise control mode is requested. Vehicle cruise control may be requested via a driver operating a push button or other human/machine interface. In vehicle speed control mode or cruise control mode, vehicle speed is controlled to a desired speed request by the driver. Engine torque is adjusted via a torque actuator such as a throttle, fuel injectors, and/or cam timing to control vehicle speed to the desired speed. Thus, engine torque may be varied or adjusted to maintain vehicle speed at the desired vehicle speed requested by the driver. Method 500 proceeds to 504 if vehicle speed control mode is requested. Otherwise, method 500 exits.

At 504, method 500 judges GPF soot load (e.g., amount of soot stored in the particulate filter) is greater than (G.T.) a first threshold or if a variable in controller memory SOOT_MAX_LATCH is set to a predetermined value (e.g., 1). If so, method 500 proceeds to 508. Otherwise, method 500 proceeds to 506. Setting SOOT_MAX_LATCH enables passive regeneration of the particulate filter to occur while the vehicle is moving and is being driven.

At 506, method 500 monitors one or more sensors to estimate the amount of soot stored in the particulate filter. In one example, the amount of soot stored in the particulate filter may be estimated based on a pressure ratio across the particulate filter while the engine is combusting air and fuel. The pressure ratio indexes a table or function that contains empirically determined amounts of soot stored in the particulate filter based on a pressure ratio across the particulate filter. Method 500 proceeds to 507 after the amount of soot stored in the particulate filter is determined.

At 507, method 500 adjusts vehicle speed controller gains and limits to base values (e.g., values used when particulate matter stored within the particulate filter is less than a second threshold). The base values may constrain the vehicle speed upper and lower limits closer to the desired vehicle speed than the vehicle speed upper and lower limits when the particulate filter is storing more than a first threshold amount of soot. For example, a base upper vehicle speed limit may be 104 KPH when desired vehicle speed is 100 KPH and an upper vehicle speed limit when the particulate filter is storing more than a first threshold amount of soot may be 107 KPH when the desired vehicle speed is 100 KPH. A base lower vehicle speed limit may be 96 KPH when desired vehicle speed is 100 KPH and a lower vehicle speed limit when the particulate filter is storing more than a first threshold amount of soot may be 93 KPH when the desired vehicle speed is 100 KPH. Further, vehicle speed controller gains may be returned to base values for times when the amount of soot stored in the particulate filter is less than the second threshold amount. In one example, the base vehicle speed controller gains for when the amount of soot stored in the particulate filter is less than the second threshold may be decreased as compared to vehicle speed controller gains when the amount of soot stored in the particulate filter is greater than the first threshold. Consequently, engine torque demands may not change as quick when the amount of soot stored in the particulate filter is less than the second threshold so as not to enter deceleration fuel shut-off frequently. Method 500 returns to 502 after vehicle speed controller gains and limits are adjusted to base values.

At 508, method 500 sets the SOOT_MAX_LATCH variable to a value of one to indicate that particulate filter regeneration is desired. Setting the variable to a value of one indicates that particulate filter regeneration is desired. Additionally, in some examples, method 500 may begin monitoring a section of road for road conditions such as present road grade and road grade a predetermined distance from the vehicle. If a road grade at the predetermined distance from the present road grade changes by more than a threshold amount, method 500 may begin retarding spark if particulate filter temperature is less than a threshold temperature. By retarding spark timing before the road grade changes, it may be possible to elevate particulate filter temperature to a temperature desirable for particulate matter regeneration before the vehicle enters a deceleration fuel shut-off mode. The present road grade and road grade a predetermined distance from the vehicle's present position may be supplied via maps stored in the controller and the GPS system. In this way, conditions where the particulate filter may be regenerated may be anticipated so that the particulate filter is prepared for regeneration. Method 500 proceeds to 510 after the variable is set to a value of one.

At 510, method 500 judges if GPF temperature is greater than a threshold temperature. The GPF temperature may be measured or inferred from spark timing and engine speed and load. If method 500 judges that GPF temperature is greater than the threshold temperature, the answer is yes and method 500 proceeds to 512. Otherwise, the answer is no and method 500 proceeds to 506. In one example, the threshold temperature is a temperature where soot stored combusts when exposed to air.

Further, in some examples, additional conditions may be evaluated at 510. For example, if the vehicle is in cruise control mode and the vehicle is following a vehicle less than a threshold distance away, method 500 may proceed to 506 and 507 to operate the vehicle with speed controller gains adjusted to base gains so that speed may be controlled closer to a desired speed in an effort to maintain a desired distance to the vehicle being followed. However, if the vehicle is in cruise control mode and the vehicle is following the vehicle at greater than the threshold distance, method 500 may proceed to 512 in order to increase the probability of entering deceleration fuel shut-off.

In some examples, the controller gains may be adjusted differently depending on whether the vehicle is in an adaptive cruise control mode in which the vehicle is maintaining a distance behind a forward vehicle and controlling vehicle speed automatically, and further optionally depending on whether the vehicle is in a lane-keeping mode where steering is carried out automatically based on detected road lanes. For example, as described below in 512, the routine may modify the controller gains and threshold limits based on the soot load, and further based on the type of vehicle speed control mode present.

At 512, method 500 modifies vehicle speed controller gains and limits to values that increase the possibility of entering deceleration fuel shut-off mode while the vehicle is in speed or cruise control mode. The vehicle speed controller gains and limits may be adjusted to allow larger variation in vehicle speed from the desired vehicle speed and more rapid reductions in engine torque when vehicle speed is within a desired speed range (e.g., the desired speed range may extend from the vehicle speed lower limit to the vehicle speed upper limit). In one example, the controller values when the amount of soot stored in the particulate filter is greater than a first threshold may expand the vehicle speed upper and lower limits further from the desired vehicle speed than the vehicle speed upper and lower limits when the particulate filter is not storing more than a first threshold amount of soot. For example, an upper speed limit when the amount of soot stored in the particulate filter is greater than the first threshold may be 107 KPH when desired vehicle speed is 100 KPH and an upper speed limit when the particulate filter is not storing more than a first threshold amount of soot may be 104 KPH when the desired vehicle speed is 100 KPH. A lower speed limit when the amount of soot stored in the particulate filter is greater than the first threshold may be 93 KPH when desired vehicle speed is 100 KPH and an lower speed limit when the particulate filter is not storing more than a first threshold amount of soot may be 96 KPH when the desired vehicle speed is 100 KPH. Further, vehicle speed controller gains when an amount of soot stored in the particulate filter is greater than a first threshold may be increased as compared to vehicle speed controller gains when the amount of soot stored in the particulate filter is less than the first threshold. For example a proportional vehicle speed controller gain when an amount of soot stored in the particulate filter is greater than the first threshold may be 2. On the other hand, the proportional vehicle speed controller gain when an amount of soot stored in the particulate filter is not greater than the first threshold may be 1.2. Consequently, engine torque demands may change quicker when the amount of soot stored in the particulate filter is greater than the first threshold so as to enter deceleration fuel shut-off more frequently (e.g., ceasing to fuel one or more engine cylinders while the engine is rotating). Method 500 proceeds to 514 after vehicle speed controller gains and limits are adjusted.

Additionally, the gains and limits may be further adjusted based on whether the vehicle is in an adaptive cruise control mode. If so, the gains and limits may be further adjusted. In one example, the amount of increase and/or decrease in the gains and/or limits (as a function of soot) may be decreased as the forward distance to the vehicle that is being followed decreases. In one example, the gains may approach the gains and limits used when soot is below the threshold as the distance decreases to a minimum distance. In this way, as the following distance decreases, tighter control of speed obtained. Likewise, the adjustment to the gains based on soot may be decreased under conditions of lane-keeping control, as compared to manual steering control. Thus, even when soot storage is above the threshold to trigger gain and limit adjustments, such adjustments are reduced or eliminated when in lane-keeping control mode and/or when the distance to a forward vehicle reaches a minimum threshold in an adaptive cruise control mode.

At 514, the vehicle is operated in speed or cruise control mode with limits and gains that are based on the amount of soot stored in the particulate filter exceeding a first threshold. The vehicle speed is controlled to a desired vehicle speed via adjusting one or more engine torque actuators. Method 500 proceeds to 516 after beginning to operate the vehicle with the revised vehicle speed controller parameters.

At 516, method 500 judges if vehicle conditions are acceptable to enter deceleration fuel shut-off. In one example, method 500 may judge that conditions are acceptable to enter deceleration fuel shut off when wheel torque demand (e.g., a requested amount of torque requested via the vehicle speed controller) is less than a threshold wheel torque demand, when vehicle speed is greater than a threshold vehicle speed, and when the wheel torque demand has been less than the threshold wheel torque demand for longer than a threshold amount of time. Such conditions may result from road conditions and operating in the speed control mode. In other examples, method 500 may judge to enter deceleration fuel shut-off in response to a change in road grade or when a magnitude of a negative road grade is greater than a threshold. For example, if a GPS system or inclinometer indicates a change from a flat road grade, or a positive road grade to a negative road grade, method 500 may enter deceleration fuel shut-off. Further, if a magnitude of a negative road grade is greater than a threshold, method 500 may enter deceleration fuel shut-off. The vehicle may enter a deceleration fuel shut-off mode while operating in cruise control or speed control mode. For example, if the vehicle begins traveling down a section of road with a negative grade that allows vehicle speed to be maintained with a small wheel torque demand, the vehicle may enter deceleration fuel shut-off mode. If method 500 judges that conditions are acceptable for entering deceleration fuel shut-off, method 500 proceeds to 518. Otherwise, method 500 proceeds to 506. Thus, deceleration fuel shut-off mode may not be entered if vehicle conditions arising from road conditions of a section of road the vehicle is traveling on are insufficient to lower the wheel torque demand for a predetermined amount of time while vehicle speed is greater than a threshold speed.

At 518, method 500 ceases to inject fuel to one or more engine cylinders and enter deceleration fuel shut-off mode. By ceasing to inject fuel to one or more cylinders, an excess amount of air may pass through the engine to the particulate filter facilitating combustion of soot stored in the particulate filter. Further, in some examples, the engine throttle position may be adjusted based on the amount of soot stored in the particulate filter. For example, if the amount of soot stored in the particulate filter is greater than the first threshold amount, a first amount of air may be allowed to flow through the engine to the particulate filter. If the amount of soot stored in the particulate filter is less than the first threshold amount, a second amount of air greater than the first amount of air may be allowed to flow through the engine to the particulate filter. In this way, the combustion rate of soot in the particulate filter may be controlled. Method 500 proceeds to 520 after the vehicle enters deceleration fuel shut-off mode.

At 520, method 500 judges if it is desirable to exit deceleration fuel shut-off (DFSO) mode. In one example, deceleration fuel shut-off mode may be exited in response to an increase in requested wheel torque. Deceleration fuel shut-off mode may also be exited if vehicle speed is reduced to less than a threshold speed. If method 500 judges to exit deceleration fuel shut-off mode, the answer is yes and method 500 proceeds to 522. Otherwise, the answer is no and method 500 returns to 518.

At 522, method 500 judges if soot load or the amount of soot stored in the particulate filter is less than (L.T.) a second threshold GPF_LOAD_MIN. In one example, the amount of soot stored in the particulate filter is based on a pressure change or drop across the particulate filter. If method 500 judges that the amount of soot stored in the particulate filter is less than the second threshold, the answer is yes and method 500 proceeds to 524. Otherwise, the answer is no and method 500 proceeds to 506.

At 524, method 500 clears the variable SOOT_MAX_LATCH by setting it to a value of zero. Resetting the variable indicates that particulate filter regeneration is complete. Method 500 proceeds to 506 after SOOT_MAX_LATCH is cleared.

Thus, the method of FIG. 5 provides for a method for regenerating a particulate filter, comprising: operating a vehicle in an automatic speed control mode; adjusting one or more vehicle speed control mode parameters in response to an amount of soot stored in a particulate filter exceeding a first threshold while operating the vehicle in the automatic speed control mode; and entering a deceleration fuel shut-off mode while operating the vehicle in the automatic speed control mode. The method includes where torque of an engine is adjusted to maintain vehicle speed at a desired speed in the automatic speed control mode. The method also includes where adjusting one or more vehicle speed control mode parameters increases a possibility of entering the deceleration fuel shut-off mode. The method further comprises adjusting the one or more vehicle speed control parameters in response to the amount of soot stored in the particulate filter being less than a second threshold amount. The method further comprises retarding spark timing in anticipation of a road condition and a temperature of the particulate filter. The method includes where the road condition is a change in road grade.

Referring now to FIG. 6, an example vehicle operating sequence for a vehicle operating in a cruise control mode on a road is shown. Vertical markers at times T0-T6 represent times of interest during the sequence. All of the plots occur at a same time and same vehicle operating conditions. In cruise control mode, the vehicle wheel torque command or motive power source torque demand is provided via a vehicle speed controller other than a driver. The vehicle speed controller has objectives in cruise control mode that influence the torque demand output by the controller, and the objectives may be at least partially defined by constraints such as maximum and minimum vehicle speed limits. The vehicle speed controller may vary an engine torque demand in cruise control mode to hold vehicle speed within the desired vehicle speed range without driver input to the vehicle speed controller or without the driver requesting torque from the engine. Thus, the torque command in cruise control mode may be based on a desired vehicle speed requested by a driver. The vehicle speed controller may adjust torque of a motive torque source to achieve the desired vehicle speed.

The first plot from the top of FIG. 6 is a plot of vehicle speed versus time. The horizontal axis represents time and time increases from the left side of the plot to the right side of the plot. The vertical axis represents vehicle speed and vehicle speed increases in the direction of the vertical axis arrow. Horizontal line 602 represents a maximum vehicle speed limit. Horizontal line 606 represents a minimum vehicle speed limit. Dash-dot line 604 represents a desired vehicle speed. The desired vehicle speed may be selected by the driver or it may be based off of a speed limit of a road on which the vehicle is traveling. In one example, the maximum and minimum vehicle speed limits 602 and 606 are based on the desired vehicle speed. For example, the maximum and minimum vehicle speeds may be the desired vehicle speed plus an offset (e.g., maximum vehicle speed) and minus the offset (e.g., minimum vehicle speed) respectively. The actual vehicle speed is indicated by the solid line.

The second plot from the top of FIG. 6 is a plot of vehicle speed controller gain versus time. In one example, the gain is a proportional gain; however, depending on the type of vehicle speed controller, the gain may be an integral gain or a matrix of gain values. In this example, the gain is a gain for a proportional controller. The horizontal axis represents time and time increases from the left side of the plot to the right side of the plot. The vertical axis represents vehicle speed controller gain and the vehicle speed controller gain increases in the direction of the vertical axis arrow.

The third plot from the top of FIG. 6 is a plot of gasoline particulate filter (GPF) soot load or the amount of soot stored in the particulate filter versus time. The vertical axis represents an amount of soot stored in the particulate filter and the amount of soot increases in the direction of the vertical axis arrow. The horizontal axis represents time and time increases from the left side of the plot to the right side of the plot. Horizontal line 610 represents an upper or first threshold soot load above which vehicle speed controller control parameters may be adjusted. Horizontal line 612 represents a lower or second threshold soot load below which vehicle speed controller control parameters are base values.

The fourth plot from the top of FIG. 6 is a plot of vehicle deceleration fuel shut-off mode (DFSO) state versus time. The horizontal axis represents time and time increases from the left side of the plot to the right side of the plot. The vertical axis represents DFSO state and DFSO is active when the trace is at a higher value near the vertical axis arrow. DFSO is not active when the trance is at a lower level near the horizontal axis.

The fifth plot from the top of FIG. 6 is a plot of gasoline particulate filter (GPF) regeneration state versus time. The horizontal axis represents time and time increases from the left side of the plot to the right side of the plot. The vertical axis represents GPF regeneration and the GPF is being regenerated when the trace is at a higher value near the vertical axis arrow. The GPF is not being regenerated when the trance is at a lower level near the horizontal axis.

At time T0, the vehicle is in cruise control mode and the controller gain is at a lower level. The vehicle speed upper limit and the vehicle speed lower limit are relatively close to the desired vehicle speed 604. The GPF soot load is less than 610 and the vehicle is not in DFSO mode. Further, the GPF is not being regenerated. These conditions may be observed when the vehicle is traveling on a level road in cruise control mode.

Between time T0 and time T1, the GPF soot load continues to increase and the vehicle speed is maintained between upper limit 602 and lower limit 606. The controller gain and vehicle speed limits remain at their same respective levels and the vehicle does not enter DFSO or GPF regeneration.

At time T1, the GPF soot threshold exceeds the first threshold level 610. The vehicle speed controller gain is increased and the vehicle speed upper limit is increased and the vehicle speed lower limit is decreased in response to the soot threshold. By changing the vehicle speed controller gain and the vehicle upper speed limit and vehicle lower speed limit, engine torque reductions may increase in magnitude and duration so that DFSO and GPF regeneration may occur more frequently and for longer durations. In one example, tables in memory contain empirically determined vehicle speed controller gains and vehicle speed limit adjustments that are a function of the amount of soot stored in the particulate filter. The vehicle does not enter DFSO and the GPF is not being regenerated.

At time T2, the vehicle enters DFSO mode and passive GPF regeneration begins. By allowing air to flow through engine cylinders as the engine rotates after fuel is shut off to the cylinders, combustion of soot in the particulate filter may be initiated. The amount of soot stored in the particulate filter begins to be reduced upon GPF regeneration beginning. The vehicle is decelerating while in DFSO mode. The adjusted vehicle speed controller gain and vehicle speed limits may provide for larger and more rapid changes in engine torque so that DFSO mode may be entered sooner and for a longer duration as compared to if the vehicle speed controller operated with base control parameters.

At time T3, the vehicle speed approaches the lower vehicle speed limit 606 and engine torque is increased (not shown) so that vehicle speed remains between upper vehicle speed limit 602 and lower vehicle speed limit 606. The vehicle exits DFSO mode and GPF regeneration mode in response to the engine torque increase. The amount of soot stored in the GPF remains above second threshold 612 so the vehicle speed controller gain and vehicle speed limits remain at their same levels.

At time T4, the vehicle enters DFSO again and GPF regeneration begins for a second time. The vehicle enters DFSO as the vehicle decelerates. The amount of soot stored in the particulate filter is reduced as the particulate filter regenerates via combusting soot stored in the particulate filter using air pumped through the engine. The vehicle speed controller gain and vehicle upper and lower speed limits remain at their previous levels.

Between time T4 and time T5, the amount of soot stored in the particulate filter continues to decrease. All other operating conditions remain at their respective levels.

At time T5, the amount of soot stored in the particulate filter is reduced to less than threshold 612. The vehicle exits DFSO and GPF regeneration in response to the amount of soot stored in the particulate filter being less than threshold 612. The upper vehicle speed limit is reduced and the lower vehicle speed limit is increased in response to the amount of soot stored in the particulate filter being less than threshold 612. Further, the vehicle speed controller gain is reduced in response to the amount of soot stored in the particulate filter being less than threshold 612.

Between time T5 and time T6, the amount of soot stored in the particulate filter remains less than the first threshold level 610. Therefore, the vehicle speed controller gain and vehicle speed upper and lower limits remain at their respective base levels where the vehicle is expected to enter deceleration fuel shut-off less frequently and for shorter durations. The vehicle does not enter deceleration fuel shut-off, nor is the particulate filter regenerated.

At time T6, the vehicle enters deceleration fuel shut-off mode, but the particulate filter is not regenerated because particulate filter temperature (not shown) is not high enough to regenerate the particulate filter. The vehicle enters deceleration fuel shut-off for only a short duration and then exits. The vehicle speed controller gain and vehicle speed upper and lower limits remain at their respective base levels since the amount of soot stored in the particulate filter is less than the first threshold level 610.

In this way, the gasoline particulate filter may be periodically regenerated via adjusting vehicle speed controller control parameters so that the vehicle may enter deceleration fuel shut-off mode more frequently where the particulate filter may be regenerated. In addition, the vehicle may remain in vehicle speed control mode so that the vehicle may continue to operate in an expected way.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
a spark ignited engine;
an exhaust system coupled to the spark ignited engine, the exhaust system including a particulate filter; and a controller, the controller including executable instructions stored in non-transitory memory to operate the spark ignited engine and adjust one or more automatic vehicle speed controller parameters in response to an amount of soot stored in the particulate filter greater than a threshold amount.

2. The vehicle system of claim 1, further comprising additional instructions to control an amount of air flowing through the spark ignited engine during a condition of deceleration fuel shutoff in response to the amount of soot stored in the particulate filter.

3. The vehicle system of claim 1, further comprising additional instructions to retard spark timing of the spark ignited engine in response to being within a threshold distance of an expected road condition where deceleration fuel shut off is expected.

4. The vehicle system of claim 1, where the one or more automatic vehicle speed controller parameters includes a controller gain variable.

5. The vehicle system of claim 4, where the one or more automatic vehicle speed controller parameters includes a controller desired vehicle speed upper limit.

6. The vehicle system of claim 1, where the one or more automatic vehicle speed controller parameters is adjusted to increase a frequency of entering a deceleration fuel shut-off mode of operation.

7. The vehicle system of claim 6, where fuel supplied to one or more engine cylinders ceases to flow in the deceleration fuel shut-off mode of operation.

8. A vehicle system, comprising:
a spark ignited engine;
a controller, the controller including executable instructions stored in non-transitory memory to operate the spark ignited engine and enter a deceleration fuel shut-off mode in response to vehicle conditions resulting from road conditions of a section of road and an amount of soot stored in a particulate filter being greater than a threshold amount while the vehicle is operated in a speed control mode.

9. The vehicle system of claim 8, further comprising additional instructions to not enter the deceleration fuel shut-off mode in response to vehicle conditions resulting from road conditions of the section of road and the amount of soot stored in the particulate filter being less than the threshold amount while the vehicle is operating in the speed control mode.

10. The vehicle system of claim 8, further comprising adjusting one or more vehicle speed control parameters in response to the amount of soot stored in the particulate filter being greater than the threshold amount.

11. The vehicle system of claim 8, where the road condition is a change in road grade.

12. The vehicle system of claim 11, where the change in road grade is from a positive grade to a negative grade.

13. The vehicle system of claim 8, further comprising additional instructions to retard spark timing in anticipation of a road condition and the amount of soot stored in the particulate filter being greater than the threshold amount.

14. The vehicle system of claim 13, where the road condition is anticipated via a navigation system.

15. A method for regenerating a particulate filter, comprising:
operating a vehicle in an automatic speed control mode;
adjusting one or more vehicle speed control mode parameters in response to an amount of soot stored in a particulate filter exceeding a first threshold while operating the vehicle in the automatic speed control mode; and
entering a deceleration fuel shut-off mode while operating the vehicle in the automatic speed control mode.

16. The method of claim 15, where torque of an engine is adjusted to maintain vehicle speed at a desired speed in the automatic speed control mode.

17. The method of claim 15, where the one or more vehicle speed control mode parameters is adjusted to increase a frequency of entering the deceleration fuel shut-off mode.

18. The method of claim 15, further comprising adjusting the one or more vehicle speed control parameters in response to the amount of soot stored in the particulate filter being less than a second threshold amount.

19. The method of claim 15, further comprising retarding spark timing in anticipation of a road condition and a temperature of the particulate filter.

20. The method of claim 19, where the road condition is a change in road grade.

* * * * *